United States Patent [19]

Saunders

[11] Patent Number: 5,468,092
[45] Date of Patent: Nov. 21, 1995

[54] CLAMP FOR CONDUIT SECTIONS

[76] Inventor: Eugene K. Saunders, 6148 Thorncrest Dr., Bloomfield Hills, Mich. 48301

[21] Appl. No.: 163,137

[22] Filed: Dec. 7, 1993

[51] Int. Cl.⁶ ..................................................... F16B 2/02
[52] U.S. Cl. ......................... 403/385; 403/65; 403/110; 403/DIG. 9; 248/67.7; 248/229.2; 248/541; 256/68
[58] Field of Search ..................... 403/384, 385, 403/386, 388, 389, 390, 391, 396, 398, DIG. 9, 394–395, 405.1, 406.1, 407.1, 65, 110; 256/65, 66, 67, 68; 285/283, 184; 24/277, 335; 248/67.7, 229, 540–541, 74.4

[56] References Cited

U.S. PATENT DOCUMENTS

| | | |
|---|---|---|
| 862,246 | 8/1907 | Gutelius . |
| 878,867 | 2/1908 | Coldwell . |
| 1,020,123 | 3/1912 | Brampton et al. . |
| 2,001,215 | 5/1935 | Ruppel . |
| 2,705,603 | 4/1955 | Bitz et al. ................................ 248/541 |
| 2,876,027 | 3/1959 | Sulmonetti ........................... 256/65 X |
| 2,906,551 | 9/1959 | May ....................................... 256/65 X |
| 2,945,713 | 7/1960 | Sears .................................... 403/385 X |
| 3,354,892 | 11/1967 | Freider . |
| 3,424,178 | 1/1969 | Yazaki . |
| 3,677,582 | 7/1972 | Flick ....................................... 403/391 |
| 4,007,993 | 2/1977 | Schwartz . |
| 4,197,764 | 4/1980 | Avernhammer . |
| 4,208,038 | 6/1980 | Reid ...................................... 256/65 X |
| 4,311,407 | 1/1982 | Doyle . |
| 4,353,661 | 10/1982 | Ruther . |
| 4,848,953 | 7/1989 | Young . |
| 4,860,985 | 8/1989 | Olson et al. ............................. 248/229 |

FOREIGN PATENT DOCUMENTS

| | | | |
|---|---|---|---|
| 495157 | 4/1950 | Belgium ................................ 403/394 |
| 384669 | 12/1932 | United Kingdom ................... 403/385 |

Primary Examiner—Eric K. Nicholson
Assistant Examiner—Harry C. Kim
Attorney, Agent, or Firm—Gifford, Krass, Groh, Sprinkle, Patmore, Anderson & Citkowski

[57] ABSTRACT

A clamp for securing together sections of conduit has a first clamping section and a second clamping section. Each clamping section is made up of a base portion and a connecting plate which extends from the base portion. The connecting plates each have a through-hole formed therethrough and are aligned so that a bolt may be inserted. The bolt pivotally connects the first and second clamping sections together. A pair of U-clamps are provided and secure each respective conduit section to its associated clamping section. The sections of conduit are secured within the clamping sections so as to be in a plane parallel to each other while being adjustable to any desired angle. The sections of conduit may also be rotated within the clamping sections to angle the clamp with respect to other clamps attached to opposing ends of the conduit sections.

12 Claims, 1 Drawing Sheet

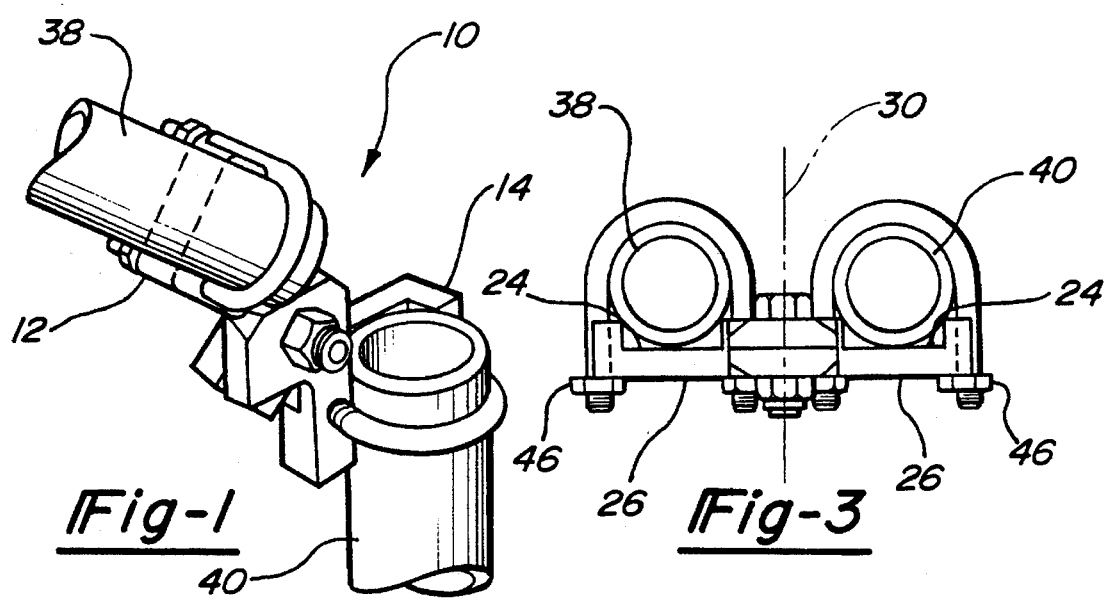
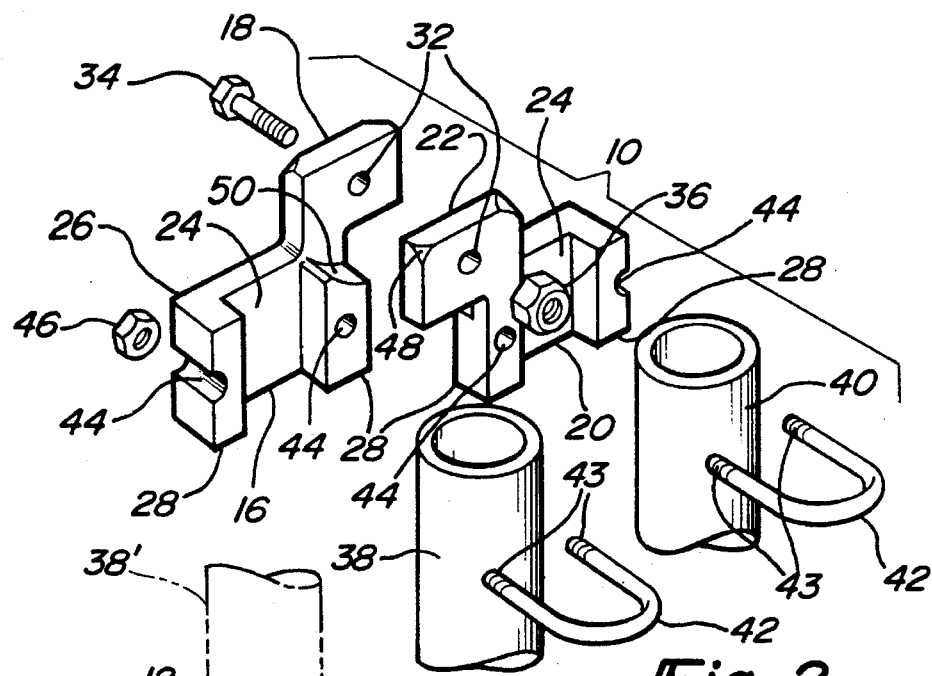
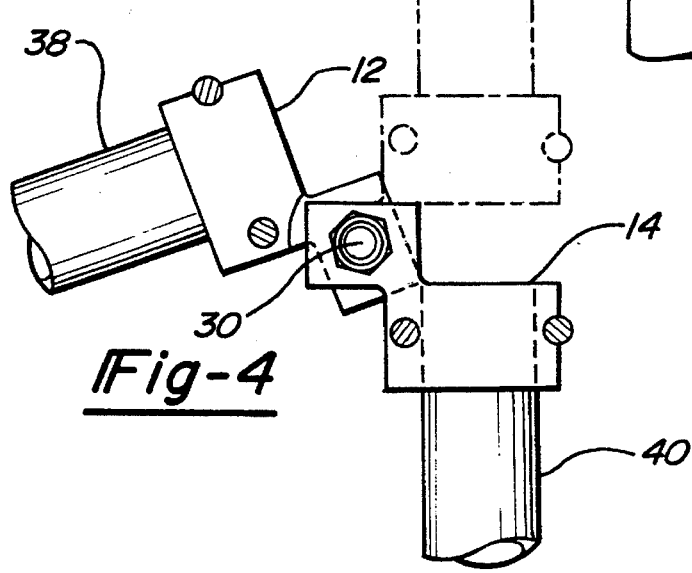

CLAMP FOR CONDUIT SECTIONS

BACKGROUND OF THE INVENTION

1. Field of the Invention

The present invention relates generally to clamps and, more particularly, to a clamp for securing successive conduit sections at any desired angle.

2. Description of the Prior Art

Various clamps and coupling means are known in the art for securing pipe or similar conduit U.S. Pat. No 4,007,993, issued to Schwartz, teaches a pipe coupler having a pair of gripping members. The gripping members are each contoured to create an open channel for receiving horizontal and vertical portions of conduit The gripping members are drawn together around the conduit sections by tightening means provided in planar webs located between the channels. The shortcoming of Schwartz is that it does not provide any means for selectively adjusting the angle created by the horizontal and vertical conduit sections. Rather, the disclosure of Schwartz requires that the conduit sections always are fixed at a position of ninety degrees relative to each other.

U.S. Pat. No. 4,311,407, issued to Doyle, teaches a multi-position clamp for overlapping portions of conduit. The clamping sections of Doyle are angularly adjustable to one another, however the conduit sections contained therein must overlap and include a pad which is sandwiched therebetween to enable the device to be angularly adjusted. The device shown in Doyle is not capable of angularly positioning successive conduit sections which are in a parallel plane to each other and which do not contact or overlap each other.

SUMMARY OF THE PRESENT INVENTION

The present invention is a clamp for successive conduit sections. A first clamping section and a second clamping section are connected so as to be pivotal about a central axis. A first conduit section and a second conduit section are secured to the first and second clamping sections so as to be positioned in a plane parallel to each other and do not contact each other. The angle established between the conduit sections is varied by adjusting the pivot point between the first and second clamping sections.

BRIEF DESCRIPTION OF THE DRAWING

A detailed description of the preferred embodiment of the present invention will become more apparent upon reference to the attached drawing, wherein like reference numbers refer to like parts throughout the several views, and in which:

FIG. 1 is an elevational view of the clamp of the present invention;

FIG. 2 is an exploded view of the clamp of the present invention;

FIG 3 is an end view of the clamp assembly which shows the conduit sections in a plane parallel to one another; and FIG. 4 is a frontal view, similar to the view shown in FIG. 1 and showing a first position of the angle-adjustable clamp assembly in solid and a second position in phantom.

DETAILED DESCRIPTION OF THE PREFERRED EMBODIMENT

Referring to FIGS. 1 and 2, a clamp for securing successive section of conduit is shown at 10. The clamp 10 is divided between a first clamping section 12 and a second clamping section 14. The first and second clamping sections 12 and 14 are constructed from any suitable lightweight and durable material, but are preferably a steel, an aluminum or a durable plastic.

Referring again to FIG. 2 the first clamping section 12 and the second clamping section 14 are divided into a first base portion 16 with a first connecting plate 18 and a second base portion 20 with a second connecting plate 22. The base portions 16 and 20 are each roughly rectangular in shape and have an upper surface 24 and a lower surface 26. The upper surfaces 24 of the base portions 16 and 20 each have raised portions 28 at opposite sides to define an inwardly recessed channel in the middle which provides a clamping edge.

The first connecting plate 18 is attached to the first base portion 16, by welding or the like, and is parallel to the upper surface 24. Similarly, the second connecting plate 22 is attached to the second base portion 20 and is parallel to the lower surface 26. The first and second connecting plates 18 and 22 overlap along axis 30 (see FIG. 3). Through-holes 32 are formed through each of the first and second connecting plates 18 and 22 and form a continuous channel when the connecting plates are aligned. A bolt 34 is insertable through the continuous channel formed by the through holes and a securing nut 36 secures the bolt 34 so that the connecting plates 18 and 22 are constrained to pivot about axis 30.

Referring again to FIGS. 1–3, a first conduit section 38 is attached to the first base portion 16 and a second conduit section 40 is attached to the second base portion 20. The conduit sections 38 and 40 are secured against the channels in the base portions 16 and 20. A U-bolt 42 is provided for securing each conduit section 38, 40 to its associated clamping section 12, 14. The curved portion of each U-bolt surrounds its respective conduit section. Opposite ends 43 of the U-bolt are received within apertures 44 formed in opposite ends of the base portions 16 and 20. Internally threaded nuts 46 secure the U-bolts 42 within the apertures 44 and prevent the conduit sections from becoming disengaged from the clamping sections 12 and 14.

The clamp assembly of the present invention secures successive conduit sections such that the clamping sections and associated conduit sections are in a plane parallel to each other and such that they do not depend on each other to make a dependable joint. Since they are in a plane parallel to each other, the conduit sections further do not contact or overlap each other. The pivoting axis 30 between the clamping sections 12 and 14 permits the user to adjust the angle between the conduit sections as desired. This is particularly desirable when the clamp assembly is used for securing conduit sections which make up a non-rectilinear skeletal frame for supporting a canvas covering of a given type.

Referring to FIG. 4, the pivoting feature of the first conduit section 38 relative to the second conduit section 40 is shown. The conduit section 38, which is secured within the clamping section 12, is pivoted about axis 30 formed by the bolt 34 inserted through holes 32. The conduit sections may further be rotated within the clamping sections to adjust the angle of a clamp from a succeeding clamp attaching to an opposite end of a given conduit section. The conduit section 38 is accordingly pivoted from a first position, represented in solid, to a second position 38 illustrated in phantom.

Referring again to FIG. 2, the edges of the connecting plates may further be chamfered, as shown at 50, to ensure adequate clearance during rotating of connecting portions relative to the base portions. Connecting plates may also be attached at a 45° degree angle to the base so that both halves of the clamp are identical to one another. The raised portions of the base portions may alternatively be machined at 48 to accommodate the edges of the connecting plates during pivoting of the clamping sections.

Having described my invention, further embodiments will become apparent to those skilled in the art to which the present invention pertains.

I claim:

1. A clamp for connecting successive sections of a conduit, comprising:

a first clamping section having a first substantially rectangular shaped base portion and a first connecting portion extending from a corner of said first base portion, said first connecting portion having a substantially planar face with a through hole formed through said face;

a second clamping section having a second substantially rectangular shaped base portion and a second connecting portion extending from a corner of said second base portion, said second connecting portion having a substantially planar face with a through hole formed through said face, said second connecting portion aligning with said first connecting portion so that said through holes form a continuous channel though said connecting portions;

a bolt extending through said continuous channel formed by said through holes for pivotally securing said first clamping section to said second clamping section;

a first U-shaped bolt for surrounding a first conduit section, opposite ends of said first bolt mounting to said first base portion for securing said first conduit section to said first base portion; and a second U-shaped bolt for surrounding a second conduit section, opposite ends of said second bolt mounting to said second base portion for securing said second conduit section to said second base portion;

said bolt for pivotally securing said second clamping section to said first clamping section providing for an adjustable angle between said conduit sections.

2. The clamp as described in claim 1, further comprising respective pairs of internally threaded nuts which engage said opposite ends of said first and second U-shaped bolts against said first and second base portions of said clamping sections.

3. The clamp as described in claim 2, further comprising a pair of raised portions protecting from an upper surface of each of said first and second base portions, said pairs of raised portions each defining a channel therebetween for receiving the conduit section gripped by said U-bolt.

4. The clamp as described in claim 3, further comprising at least one of said raised portions of said first and second base portions being machined along an edge opposite said other connecting portion so as to provide a curved surface to ensure adequate clearance between said connecting portion and said base portion during pivoting of said clamp.

5. The clamp as described in claim 3, wherein said conduit sections are positioned at a 45 degree angle relative to each other.

6. The claim as described in claim 1, further comprising a chamfered edge on at least one of said first and second connecting portions, said chamfered edge ensuring adequate clearance between said connecting portion and said opposite base portion during pivoting of said clamp.

7. The clamp as described in claim 1, wherein said clamp is constructed from a lightweight and durable material.

8. The clamp as described in claim 1, wherein said clamp is constructed from a steel.

9. The clamp as described in claim 1, wherein said clamp is constructed from an aluminum.

10. The clamp as described in claim 1, wherein said clamp is constructed from a durable plastic.

11. The clamp as described in claim 1, said conduit sections are rotatable within said clamping sections to adjust an angle between said clamp and at least one other clamp attached to opposing ends of said conduit sections.

12. A clamp for connecting successive sections of a conduit, comprising:

a first clamping section;

a second clamping section;

means for pivotally securing said second clamping section to said first clamping section;

means for securing a first conduit section to said first clamping section and means for securing a second conduit section to said second clamping section, said securing means comprising a first U-shaped bolt and a second U-shaped bolt, said U-shaped bolts surrounding the respective conduit sections and connecting to said respective clamping sections at opposite ends thereof;

internally threaded nuts engaging said opposite ends of said U-shaped bolts against said clamping sections; and a first pair of raised portions and a second pair of raised portions projecting from an upper surface of said first clamping section and said second clamping section respectively, said pairs of raised portions each defining a channel therebetween for receiving the conduit section gripped by said U-shaped bolt, at least one raised portion of said pairs of raised portions of said first clamping section being machined along an edge opposite said second clamping section to provide a curved surface to ensure adequate clearance between said clamping sections during pivoting of said clamp;

said means for pivotally securing said second clamping section to said first clamping section providing an adjustable angle between the conduit sections.

* * * * *